(12) United States Patent
Jones (10) Patent No.: US 6,786,453 B2
(45) Date of Patent: Sep. 7, 2004

(54) SNAP-IN WINDOW ASSEMBLY AND METHOD

(75) Inventor: Gary E. Jones, Mukilteo, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/047,186

(22) Filed: Oct. 25, 2001

(65) Prior Publication Data

US 2003/0080252 A1 May 1, 2003

(51) Int. Cl.⁷ .................................................. B64C 1/14
(52) U.S. Cl. ..................................... 244/129.3; 49/501
(58) Field of Search .............................. 244/119, 129.1, 244/129.3; 49/501, 502, 503, 504, 505

(56) References Cited

U.S. PATENT DOCUMENTS

| | | | |
|---|---|---|---|
| 3,050,790 A | * | 8/1962 | Wakefield ................. 244/129.3 |
| 3,191,240 A | * | 6/1965 | Slaman et al. .............. 126/200 |
| 3,906,669 A | * | 9/1975 | Vorguitch ................. 244/129.3 |
| 4,364,533 A | | 12/1982 | Pompei et al. |
| 4,541,595 A | | 9/1985 | Fiala et al. |
| 4,877,658 A | | 10/1989 | Calhoon |
| D331,215 S | | 11/1992 | Moreno et al. |
| 5,271,581 A | * | 12/1993 | Irish ........................ 244/129.3 |
| 5,467,943 A | | 11/1995 | Umeda |
| 5,816,307 A | | 10/1998 | Sanz |
| 5,826,824 A | * | 10/1998 | Martin et al. ............. 244/129.3 |
| 6,082,674 A | | 7/2000 | White et al. |
| 6,168,112 B1 | * | 1/2001 | Mueller et al. .......... 244/129.3 |
| 6,227,491 B1 | | 5/2001 | Stephan et al. |

* cited by examiner

Primary Examiner—Robert P. Swiatek
(74) Attorney, Agent, or Firm—Black Lowe & Graham PLLC (57) ABSTRACT

An aircraft window assembly with a readily attachable window assembly for efficient and easy installation and maintenance of aircraft windows. The aircraft has a sidewall having an inner perimeter that defines an opening. An inner window frame is readily attachable to the sidewall adjacent to the inner perimeter. The inner window frame defines a first opening. An outer window frame is readily attachable to the inner window frame adjacent the first opening and the outer window frame defines a second opening. The outer window frame and the inner window frame are releasably coupled within the first opening of the inner window frame. The snap-in window assembly is readily detachable from the sidewall adjacent to the inner perimeter.

20 Claims, 6 Drawing Sheets

SNAP-IN WINDOW ASSEMBLY AND METHOD

FIELD OF THE INVENTION

This invention relates generally to an aircraft window assembly, and more particularly to a snap-in window assembly and a method for installing the assembly to a sidewall panel of an aircraft.

BACKGROUND OF THE INVENTION

Current window assembly designs for aircraft include the use of different hardware fastener mechanisms for affixing the window assembly to an aircraft sidewall. The most common of these assemblies require the combination of hardware fastener mechanisms, typically brackets, and adhesives to affix the window assembly to an aircraft's fixed outer sidewall. The brackets are affixed, via the adhesive, to the sidewall. The window assemblies are then affixed to the brackets. In other installations, the window assemblies are affixed to the sidewall using both mechanical affixing and adhesive affixing. The installation of the brackets is very labor intensive and time consuming. This is because the adhesive typically has a long cure period and then must be along with the aircraft sidewall be sanded before the window assembly can be affixed to the brackets. Further installation often requires specially designed tools. In addition, fuel economy is negatively affected as the brackets and adhesives add weight to the aircraft, which in turn adds to the operating cost of the aircraft. Often too, the brackets are very pliable and weak and are subject to increased maintenance and replacement costs.

Yet another problem with current designs is an inability to consistently and uniformly attach the brackets on the aircraft sidewall. This is because the brackets cannot be exactly placed when affixed with adhesives. This leads to increased assembly costs because installers must take more time to affix and adjust the brackets.

Additionally, because there is quite a variation in affixing mechanisms between various airplane models, standardization of the window assemblages across airplane models is difficult. Difficult access to whole or part of the window assembly makes standard window maintenance, like cleaning, expensive and time consuming. This is because maintenance must be done by removing the whole window assembly or accessing the whole sidewall.

Thus, there exists a need to provide an aircraft window assembly with a readily detachable window assembly for efficient and easy installation and maintenance of aircraft windows.

SUMMARY OF THE INVENTION

The present invention provides an aircraft window assembly with a readily attachable window assembly for efficient and easy installation and maintenance of aircraft windows.

In one aspect of the invention, the aircraft has a sidewall having an inner perimeter that defines an opening.

In another aspect of the invention, the snap-in window assembly includes an inner window frame readily attachable to the sidewall adjacent to the inner perimeter. The inner window frame defines a first opening.

In yet another aspect of the invention, an outer window frame is readily attachable to the inner window frame adjacent the first opening and the outer window frame defines a second opening.

In still yet another aspect of the invention, a releasable coupling means couples the outer window frame and the inner window frame within the first opening of the inner window frame.

In yet another aspect of the invention, the snap-in window assembly is alternatively assembled prior to being releasably attached to the sidewall adjacent to the inner perimeter. The snap-in window assembly is readily detachable from the sidewall adjacent to the inner perimeter.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a snap-in window assembly and a method for installing the assembly to a sidewall panel of an aircraft.

Figure 1:
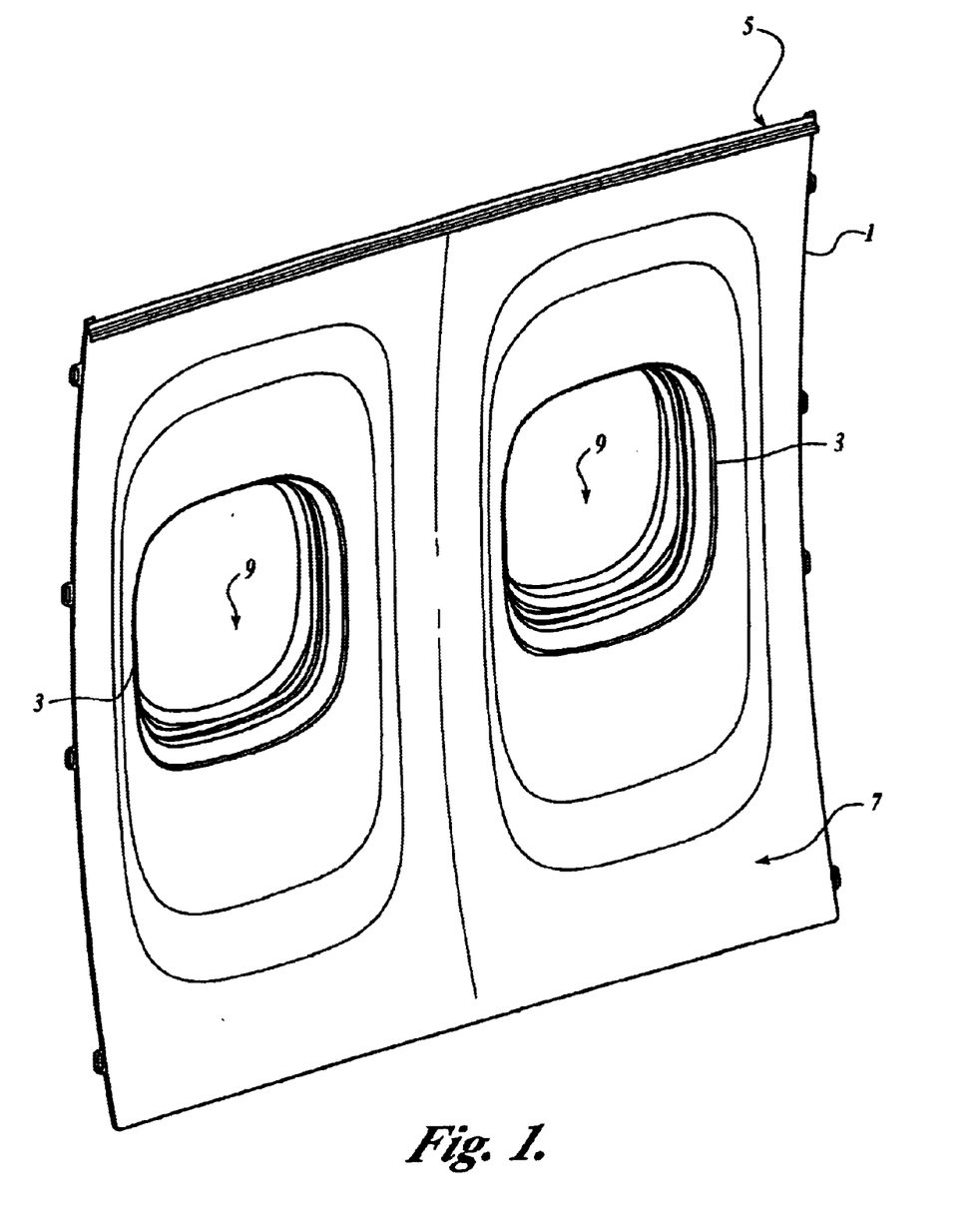
FIG. 1 depicts a section of an aircraft cabin with a cabin side view of a pair of snap-in window assemblies according to the present invention.

FIG. 1 depicts a section of an aircraft cabin sidewall 1 with a cabin side view of a pair of snap-in window assemblies 3 according to the present invention. In a presently preferred embodiment, an inner perimeter 7 of an outer side wall 5 of the aircraft cabin sidewall 1 serves as the structure for defining an opening 9 for the snap-in window assemblies 3.

Figure 2:
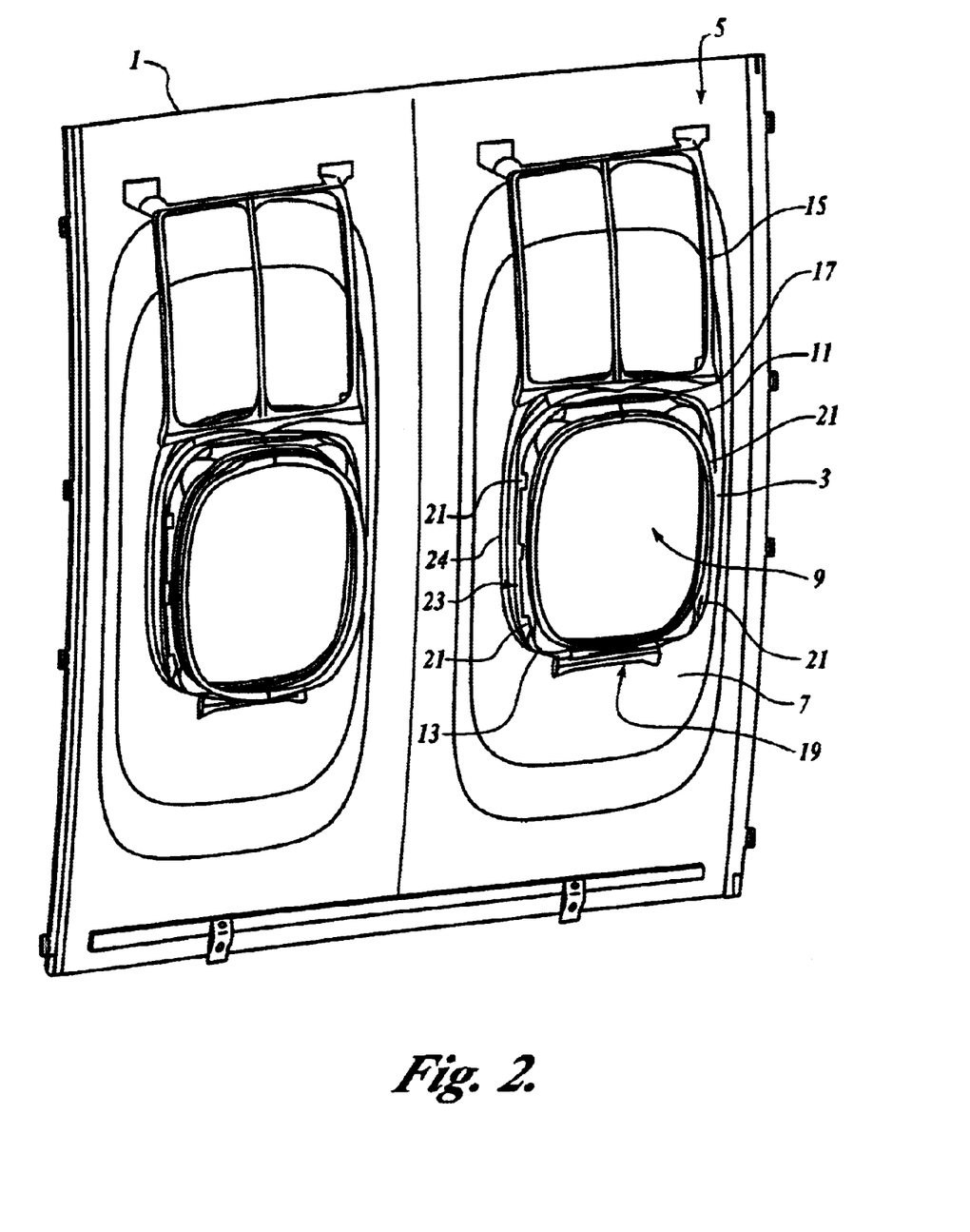
FIG. 2 depicts a view of a section of an outer sidewall opposite an aircraft cabin.

FIG. 2 depicts a section view of an outer sidewall 5 opposite an aircraft cabin sidewall 1 view of a pair of snap-in window assemblies 3 according to the present invention. The outer sidewall 5 contains an inner perimeter 7 defining an opening 9. The opening 9 serves to index a location for an inner window frame 11 and an outer window frame 13. In a preferred embodiment, the snap-in window assembly includes a sun-shade guide tract 15.

In a presently preferred embodiment, the inner window frame 11 is attached to the outer sidewall 5 in the indexed location of the opening 9 via releasable coupling devices 17 and 19 as is further illustrated in FIGS. 3–6. The releasable coupling devices 17 and 19 facilitate the coupling and decoupling of the inner window frame 11 from the opening 9 in the outer sidewall 5 without having to remove the outer sidewall 5 to access the outer window frame 13 or the inner window frame 11.

Preferably, the outer window frame 13 is attached to the inner window frame 11 via a plurality of window snap fasteners 21 contiguously spaced and aligned along a perimeter of the inner and outer window frames 11 and 13, respectively. In a preferred embodiment, the window snap fasteners 21 are one or more tension clip devices releasably secured to an accommodating protrusion 23 on the outer window frame 13 and that further snap over an accommodating protrusion 24 along the perimeter of the inner window frame 11.

The window snap fasteners 21 further serve to align the inner window frame 11 and the outer window frame 13 in the indexed opening 9 of the inner perimeter 7 of the outer sidewall 5.

Alternatively, the inner window frame 11 and outer window frame 13 are coupled via the plurality of window snap fasteners 21 contiguously spaced and aligned along a perimeter of the inner and outer window frames 11 and 13, respectively as further described above, prior to their coupling to form the snap-in window assemblies 3 readily attachable to the outer sidewall 5 via the coupling devices 17 and 19.

Figure 3:
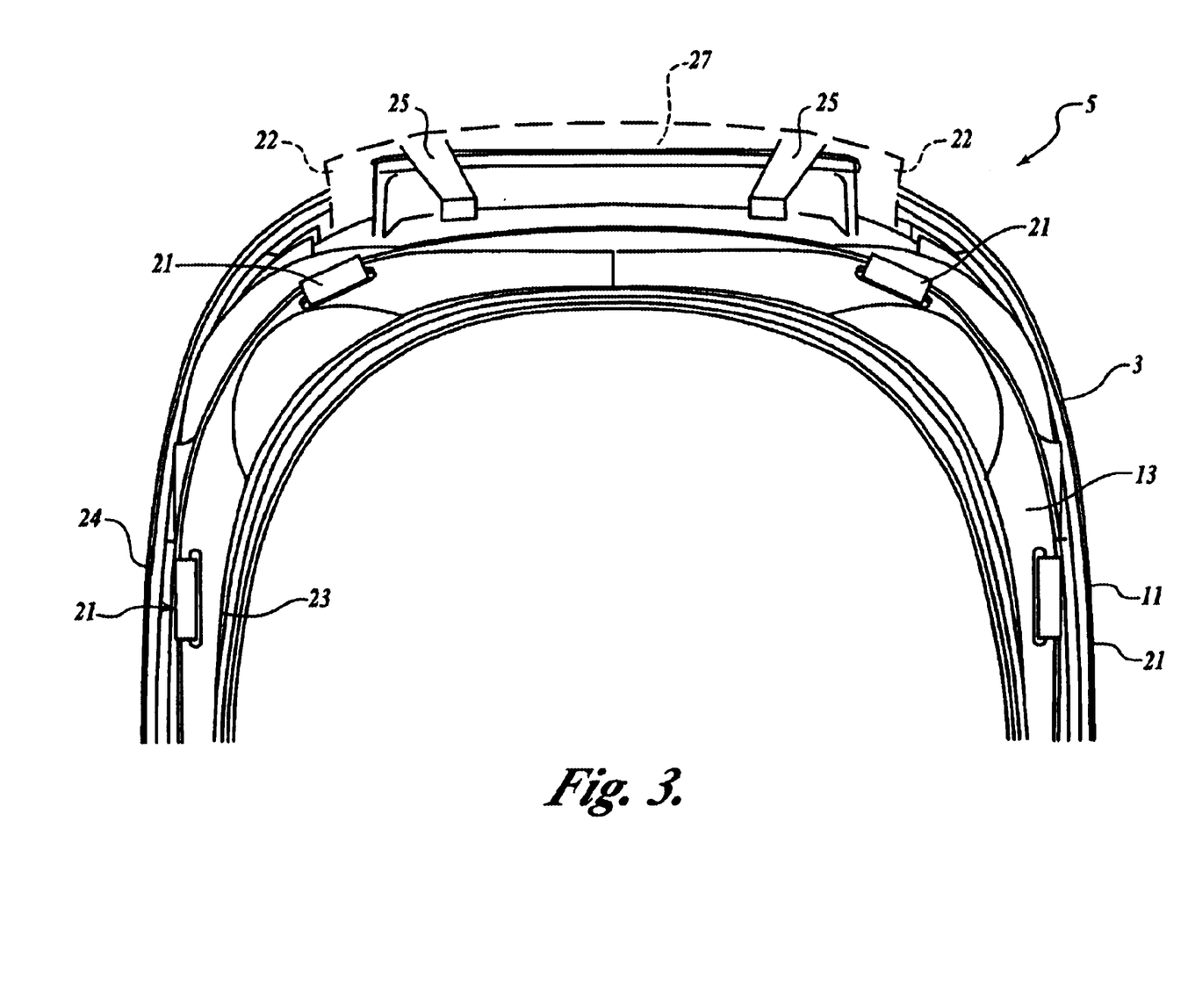
FIG. 3 depicts a view in the direction of an aircraft cabin of an upper portion of a window assembly readily attachable to an outer sidewall.

FIG. 3 depicts a view in the direction of an aircraft cabin of an upper portion of a window assembly 3 that is attached to an outer sidewall 5. The outer window frame 13 is readily attached to the inner window frame 11 by a plurality of window snap fasteners 21 as further illustrated in FIG. 2. In a preferred embodiment, the window snap fasteners 21 are one or more tension clip devices releasably secured to an accommodating protrusion 23 on the outer window frame 13 and that further snap over an accommodating protrusion 24 along the perimeter of the inner window frame 11.

The snap fasteners 21 further permit detaching the inner window frame 11 and the outer window frame 13 from the outer sidewall 5 as a single window assembly 3 without having to remove the outer sidewall 5.

In a another embodiment, the snap fasteners 21 can be secured to the inner window frame 11 and snap over a protruding surface along the perimeter of the outer window frame 13. It will be appreciated that the snap fasteners 21 are suitably any device that uses force tension to facilitate the securing and attaching of both the outer window frame 13 and the inner window frame 11 in a single window assembly 3.

The inner window frame 11 is releasably attached to the outer sidewall 5 via one or more spring clips 25 that are evenly spaced around an edge of a shaped flange 27 extending along the outer top perimeter of the inner window frame 11. In a preferred embodiment the spring clips 25 are secured to the outer sidewall 5 so that the spring clips 25 securely affix the shaped flange 27 to the outer sidewall 5. The spring clips 25 provide compressive spring force to secure assembly of the inner window frame 11 to the outer sidewall 5 in a snap-together assembly. The shaped flange 27 further provides one or more sun-shade guide tract lugs 22. The sun-shade guide track lugs 22 facilitate the attaching of a sun-shade track 15 to the shaped flange 27.

The outer window frame 13 is further releasably attached to the inner window frame 11 via the coupling of a deformable flange 29 of the outer window frame 13 and a shaped flange 28. In a presently preferred embodiment, the deformable flange extends along a portion of the outer top perimeter of the outer window frame 13 and is designed such that it is formed to define a pliable hook 30 as further depicted in FIGS. 4 and 4A. The deformable flange allows the coupling of the inner window frame 11 and the outer window frame 13 without the use additional coupling hardware, for example affixable brackets.

In an alternative embodiment, the deformable flange 29 is replaced with a similarly positioned rigid flange. The rigid flange is formed so as to define a shape that is accommodating for the outer window frame 13 to engage the shaped flange 27 in a coupling snap-together assembly.

Figures 4, 4A:
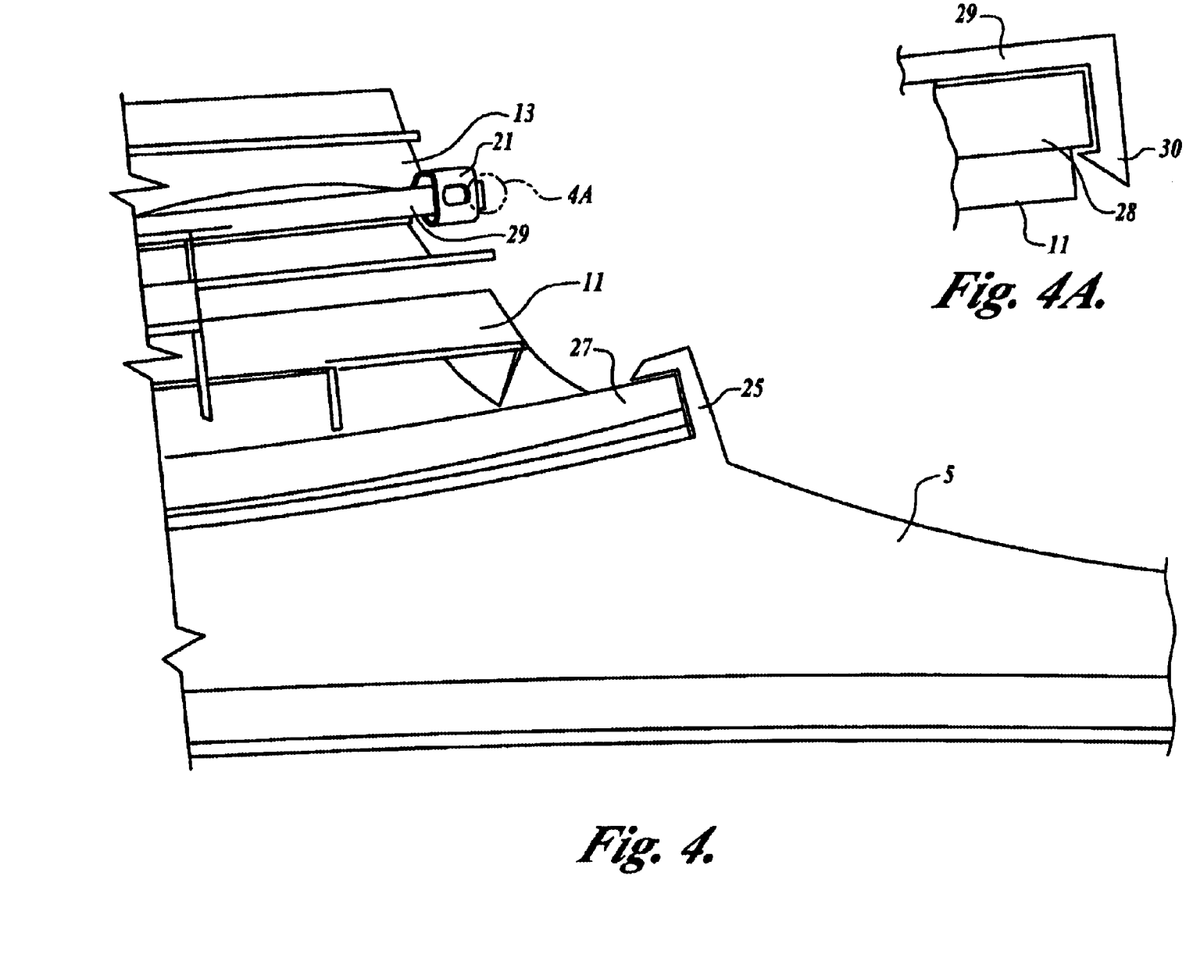
FIG. 4 depicts a side view of an upper portion of an outer window frame to show the coupling of the outer window frame to the inner window frame attached to an outer sidewall.
FIG. 4A depicts a cutaway view of a deformable flange of an outer window frame receiving and tensionably engaging a shaped flange of an inner window frame.

FIG. 4 depicts a side view of an upper portion of an outer window frame 13 to show the coupling of the outer window frame 13 to the inner window frame 11 attached to a an outer sidewall 5. As further depicted in FIG. 3, spring clips 25 are attached to the outer sidewall 5 and secure a shaped flange 25 to the outer sidewall 5. A deformable flange 29 of the outer window frame 13 is positioned over the top center of the inner window frame 11 and, is snapped over the shaped flange 28 (FIG. 4A) so that both the inner window frame 11 and the outer window frame 13 are engaged in a snap-together assembly. As shown in the cutaway view of FIG. 4A, a deformable flange 29 on the outer window frame 13 has a cross-sectional form in the nature of a pliable hook 30. The deformable flange 29 tensionably engages the shaped flange 28 of inner window frame 11. Because of the interrelationship of the deformable flange 29 of the outer window frame 13 and the shaped inner flange 28 of an inner window frame 11, the outer window frame 13 can be snapped onto the inner window frame 11 in the same way, for example, that a lid is snapped onto a can of tennis balls, or that a paint can engages its lid.

Figure 5:
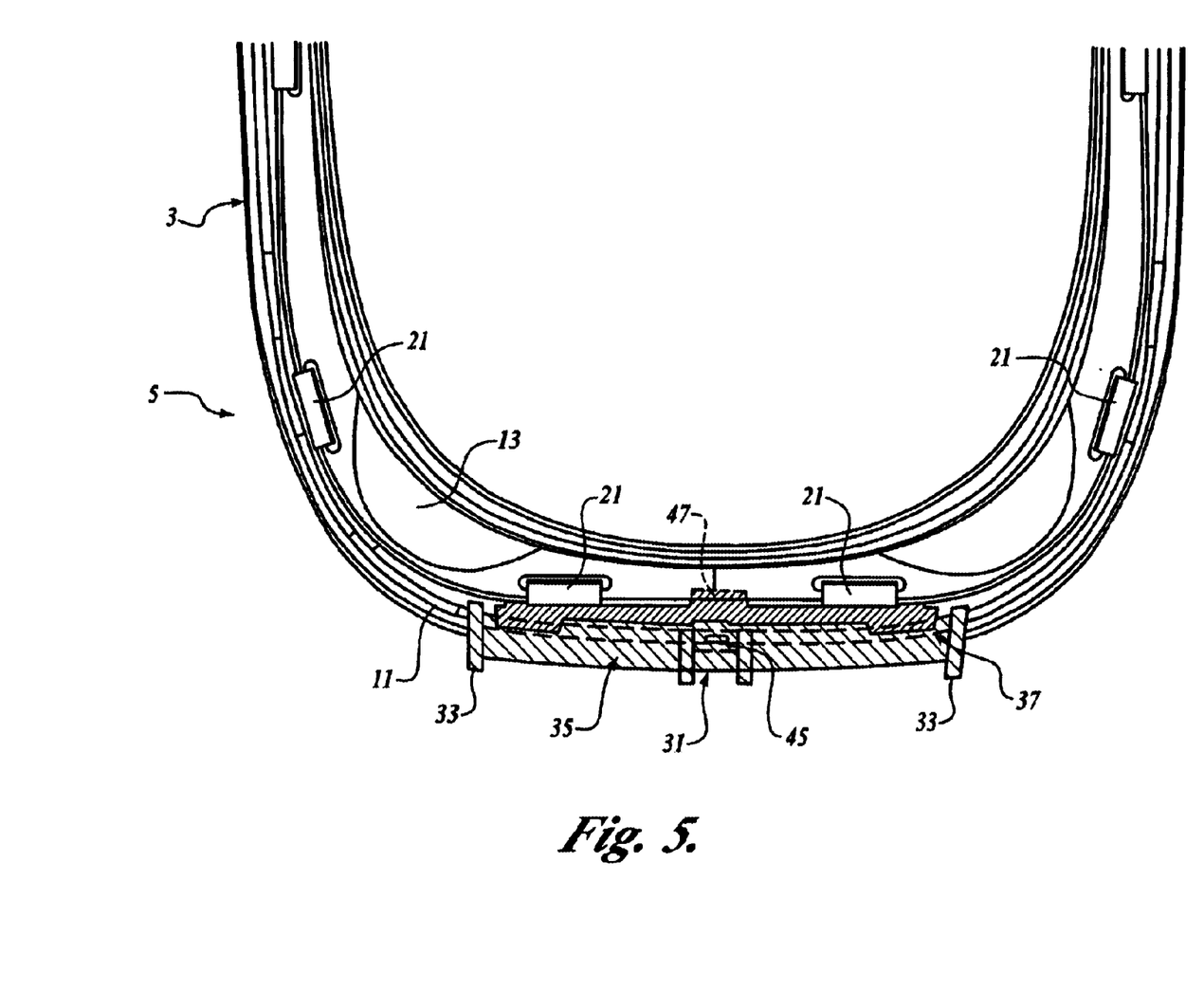
FIG. 5 depicts a view in the direction of an aircraft cabin of a lower portion of a window assembly readily attachable to an outer sidewall.

FIG. 5 depicts a view in the direction of an aircraft cabin of a lower portion of a window assembly 3 readily attached to an outer sidewall 5. An outer window frame 13 is attached to an inner window frame 11 by a plurality of window snap fasteners 21 as further illustrated in FIGS. 2 and 3.

The snap fasteners 21 further permit the decoupling of the inner window frame 11 and the outer window frame 13 from the outer sidewall 5 as a single window assembly without having to remove the outer sidewall 5.

In another embodiment, the snap fasteners 21 can be secured to the inner window frame 11 and snap over a protruding surface along the perimeter of the outer window frame 13. It will be appreciated that the snap fasteners 21 are suitably any device that uses force tension to facilitate the securing and attaching both the outer window frame 13 and the inner window frame 11 in a single window assembly.

The inner window frame 11 is further releasably attached to the outer sidewall 5 via at least one retention spring clip 31 centered within the interior surface of a gusset 33 supported shaped flange 35 extending along the lower bottom perimeter of the inner window frame 13.

In a preferred embodiment, the retention spring clip 31 is secured to the outer sidewall 5 so that the spring clip securely affixes the shaped flange 35 to the outer sidewall 5. The spring clip 31 provides compressive spring force to secure assembly of the inner window frame 11 to the outer sidewall 5 in a snap-together assembly. Gusset 33 provides maximum strength at the corner of the shaped flange 35 and is designed so that the load of the outer window frame is borne by the gussets 33 and not solely by the shaped flange 35.

Figure 6:
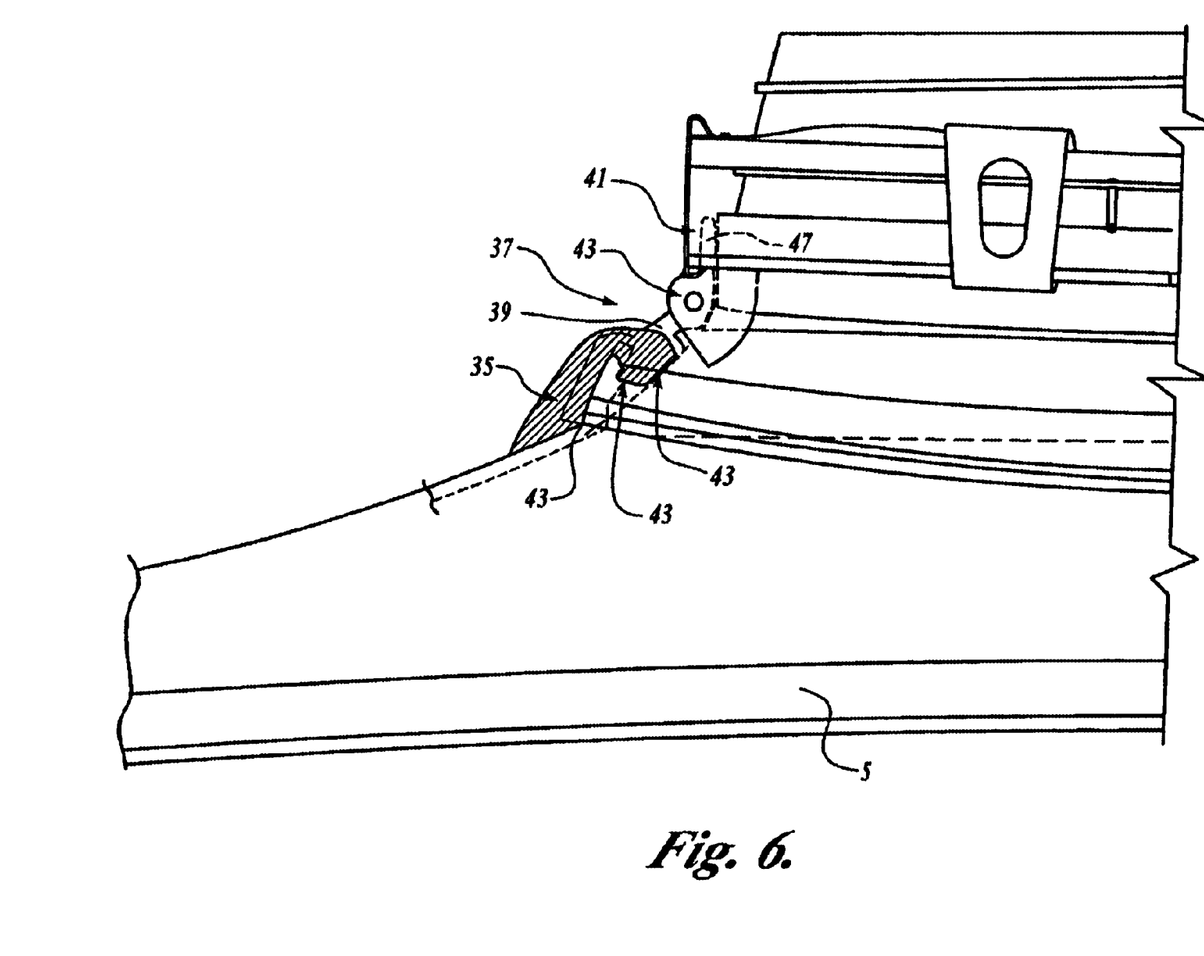
FIG. 6 depicts a side view of a lower portion of an outer window frame to show the coupling of the outer window frame to the inner window frame attached to a sidewall.

As further illustrated in the FIG. 6, the inner window frame 13 is releasably coupled to the outer sidewall 5 via a pawl latch mechanism 37.

FIG. 6 depicts a side view of a lower portion of an outer window frame to show the coupling of an outer window frame 13 to an inner window frame 11 attached to an outer sidewall 5. As further illustrated in FIG. 5, in a preferred embodiment, an inner window frame 11 is releasably attached to an outer sidewall 5 via a pawl latch mechanism 37.

The pawl latch mechanism 37 operates by rotating a latch 39, having a pawl finger 41 radially attached to its shank 43. The rotation of the latch 39 is indexed to one or more index points 43 to visually or tactily provide a relative position for opening or closing the latch to couple or decouple the inner window frame 11 from the outer sidewall 5.

In a closed position, a press of the pawl finger 41 through an access hole brings 47 the latch 39 under a shaped flange 35 of an inner window assembly 11 thereby releasably coupling the outer window assembly 13 to the inner window assembly 11 and held in position by coiled springs 45. In an opened position, a pull of the pawl finger 41 in the opposite rotation provides release of the pawl latch, thus providing a quick decoupling of the outer window frame 13 from the inner window frame 11 and disengaging the coiled springs 45. The access hole 47 provides access to the pawl finger 41 from the cabin sidewall 1.

It is further contemplated that when the inner window frame 11 remains coupled to the outer sidewall 5 via a coupling means 17 as further illustrated in FIGS. 2–4. The pawl latch mechanism 37 further allows a window assembly 3 to remain in an open position not totally decoupled from the outer sidewall 5. This would allow, for example, maintenance access to both sides of the inner window frame 11 and outer window frame 13 without having to decouple the whole window assembly 3 from the outer sidewall 5.

In alternative embodiments, it is contemplated that the pawl latch mechanism has a widely-adjustable grip range or has self-adjusting spring pawl latches.

In another alternative embodiment, the pawl latch mechanism 37 may be replaced with other latching devices that provide quick coupling and decoupling of an outer window frame 13 from an inner window frame 11.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A releasable snap-in window assembly for an aircraft having a sidewall with an inner perimeter that defines an opening, the assembly comprising:
    at least one first deformable mechanism secured to an outer surface of a sidewall;
    an inner window frame attachable to the sidewall adjacent to the inner perimeter by the at least one first deformable mechanism tensionably securing a shaped flange of the inner window frame to the sidewall, the inner window frame defining a first opening; and
    an outer window frame attachable to the inner window frame adjacent the first opening by at least one second deformable mechanism tensionably securing the outer window frame to the inner window frame, the outer window frame defining a second opening.

2. The window assembly of claim 1, wherein the first deformable mechanism is a deformable flange secured to the sidewall, the deformable flange tensionably engaging the shaped flange of the inner window frame.

3. The window assembly of claim 2, wherein the deformable flange is formed in the shape of a hook to engage the shaped flange.

4. The window assembly of claim 1, wherein the first deformable mechanism includes at least one spring clip mounted on an outer surface of the sidewall for tensionably securing the inner window frame to the sidewall.

5. The window assembly of claim 1, further including a pawl latch mechanism for securing the inner window frame to the outer surface of the sidewall.

6. The window assembly of claim 5, wherein the pawl latch mechanism further comprises engaging the shaped flange along one or more index points to couple and decouple the window assembly from the outer sidewall.

7. The window assembly of claim 1, wherein a second deformable mechanism for tensionably securing the outer window frame to the inner window frame includes at least one fastening clip.

8. The window assembly of claim 7, wherein the fastening clip includes a snap fastener releasably secured to an accommodating protrusion on the outer window frame and that further snaps over a perimeter of the inner window frame.

9. The window assembly of claim 1, wherein the sidewall is a removable sidewall.

10. A method of releasably coupling a snap-in window assembly to a sidewall of an aircraft, the method comprising:
    attaching an inner window frame to the sidewall adjacent to an inner perimeter, by securing a shaped flange of the inner window frame to the sidewall with at least one first deformable mechanism secured to an outer surface of the sidewall and configured to tensionably secure a shaped flange of the inner window frame to the sidewall, the inner window frame defining a first opening; and
    attaching an outer window frame readily attachable to the inner window frame adjacent the first opening, by securing the outer window frame to the inner window frame with at least one second deformable mechanism tensionably securing the outer window frame defining a second opening.

11. The method of claim 10, wherein the first deformable mechanism is a deformable flange secured to the outer surface of the sidewall, and the deformable flange tensionably engages the shaped flange of the inner window frame.

12. The method of claim 11, wherein the deformable flange is formed in the shape of a hook to engage the shaped flange.

13. The method of claim 11, wherein the first deformable mechanism includes at least one spring clip mounted on outer surface of the sidewall.

14. The method of claim 10, further comprising securing the inner window frame to the outer surface of the sidewall using a pawl latch mechanism.

15. The method of claim 14, wherein the pawl latch mechanism further comprises engaging the shaped flange along one or more index points to couple and decouple the window assembly from the outer surface of the sidewall.

16. The method of claim 10, wherein the second deformable mechanism for tensionably securing the outer window frame to the inner window frame comprises at least one fastening clip.

17. The method of claim 16, wherein the fastening device includes snap fastener releasably secured to an accommodating protrusion on the outer window frame and that further snap over a perimeter of the inner window frame.

18. The method claim 10, wherein the sidewall is a removable sidewall.

19. A snap-in window assembly for an aircraft having a sidewall with an inner perimeter that defines an opening, the assembly comprising:

an inner window frame attachable to the sidewall adjacent to an inner perimeter by at least one first deformable mechanism secured to an outer surface of the sidewall and configured to tensionably secure a shaped flange of the inner window frame to the sidewall, the inner window frame defining a first opening;

an outer window frame readily attachable to the inner window frame by a plurality of fastening devices releasably secured to an accommodating protrusion on the outer window frame and that further snap over a perimeter of the inner window frame adjacent the first opening, the outer window frame defining a second opening; and a means for releasably coupling the outer window frame and the inner window frame within the first opening of the inner window frame, wherein the releasably coupling means includes a shaped flange of the inner window frame attached to the outer side wall by one or more spring clips and coupled to a hook shaped deformable flange of the outer window frame and a pawl latch mechanism for engaging the shaped flange along one or more index points to couple and decouple the window assembly from the outer sidewall.

20. The window assembly of claim 19, wherein the sidewall is a removable sidewall.

* * * * *